United States Patent

[11] 3,620,556

| [72] | Inventor | Arthur L. Paddington |
| | | Thorpe Willoughby, near Selby, England |
| [21] | Appl. No. | 797,151 |
| [22] | Filed | Feb. 6, 1969 |
| [45] | Patented | Nov. 16, 1971 |
| [73] | Assignee | British Ropes Limited |
| | | Doncaster, Yorkshire, England |
| [32] | Priority | Feb. 16, 1968 |
| [33] | | Great Britain |
| [31] | | 7,853/68 |

[54] SEALING RING FOR PIPE COUPLING
4 Claims, 4 Drawing Figs.

[52] U.S. Cl. .................................................. 285/110,
277/179, 277/206, 285/336, 285/363, 285/379
[51] Int. Cl. .................................................. F16l 17/06
[50] Field of Search ............................................. 220/46;
277/179, 206, 212 F; 285/110, 111, 336, 379, 349, 363

[56] References Cited
UNITED STATES PATENTS

| 489,107 | 1/1893 | Storz | 285/379 X |
| 1,300,414 | 4/1919 | Klell | 285/110 X |
| 1,801,157 | 4/1931 | Howard | 285/379 |
| 2,462,493 | 2/1949 | Hamer | 285/110 X |
| 2,834,504 | 5/1958 | Annicq | 220/46 |
| 2,970,718 | 2/1961 | Jennings, Jr. | 220/46 X |
| 3,072,285 | 1/1963 | Aileo | 220/46 X |
| 3,447,819 | 6/1969 | Borsum et al. | 285/111 |

FOREIGN PATENTS

| 131,960 | 3/1949 | Australia | 285/110 |
| 420,750 | 3/1967 | Switzerland | 285/110 |

*Primary Examiner*—Edward J. Earls
*Attorney*—Brady, O'Boyle & Gates

ABSTRACT: A sealing ring for making a fluidtight joint between the opposing faces of two pipe flanges, the sealing ring being made on an elastomeric material and having an annular portion shaped to be retained in sealing relationship with a seating formed in one of the pipe flanges and an annular flange adapted to engage and be deflected by the other pipe flange so as to establish a sealing relationship with the said other pipe flange.

PATENTED NOV 16 1971 3,620,556

INVENTOR
ARTHUR L. PADDINGTON

BY Brady, O'Boyle & Gates

ATTORNEYS

PATENTED NOV 16 1971 3,620,556

SEALING RING FOR PIPE COUPLING

The invention is concerned with sealing rings.

Sealing rings are well known for making a fluidtight joint between two opposing faces, e.g., the opposing faces of two pipe flanges. Such rings have been made from elastomeric material and with a circular, elliptical or square cross section. Rings of this nature are satisfactory when employed in couplings to seal permanent joints or joints which are infrequently disconnected and which are conveniently provided with a new ring before reconnecting, particularly when a seating is provided in one or both faces of the coupling. However, when employed in couplings which are frequently connected and disconnected, apart from the risk of mechanical damage, as a result of frequent compression and expansion the ring may steadily lose its resilience so that it needs compressing to such an extent that its effectiveness drops sharply or tightening is required to such an extent that severe mechanical strain is imposed upon the coupling itself.

It is an object of the present invention to provide a sealing ring which avoids or mitigates the above-mentioned disadvantages.

According to the invention, there is provided a sealing ring made of elastomeric material, said ring having an annular portion shaped to be retained in sealing relationship in a seating in one coupling member and an annular flange adapted to engage and be deflected by an opposed coupling member so as to establish a sealing relationship with said opposed coupling member.

Preferably said annular portion has an annular channel facing in a radial direction (preferably radially inwards) adapted to receive an annular projection in addition seating. It is also preferred that said annular portion has a peripheral frustoconical surface arranged to taper as it extends axially into the seating.

The aforesaid annular flange preferably extends axially in a direction away from the central plane of the ring and radially inwards. It is preferred that the flange is tapered in cross section. In a preferred construction, the axially outer face of the flange is concavely curved in radial section, whereby on deflection of the flange by said opposed member said outer face of the flange flattens so that it can seat against a plane face on said opposed member.

The invention also provides a coupling having a sealing member as hereinbefore defined, the coupling having one coupling member with a seating which retains said annular portion in sealing relationship therewith, and an opposed coupling member adapted to be engaged by and to deflect said annular flange to establish a sealing relationship therewith.

The seating preferably has an annular radially directed projection adapted to be received in an annular channel in said annular portion.

Preferably, said opposed coupling member has an annular recess adapted to receive the annular flange on the sealing ring.

It is preferred that the coupling members and the sealing ring are so arranged that when the coupling members are connected together, in addition to said deflection of the annular flange, there is some compression of the ring between opposed surfaces of said coupling members.

The following is a description, by way of example, of embodiments of a sealing ring and a coupling in accordance with the invention, reference being made to the accompanying drawings, in which:-

Figure 1:
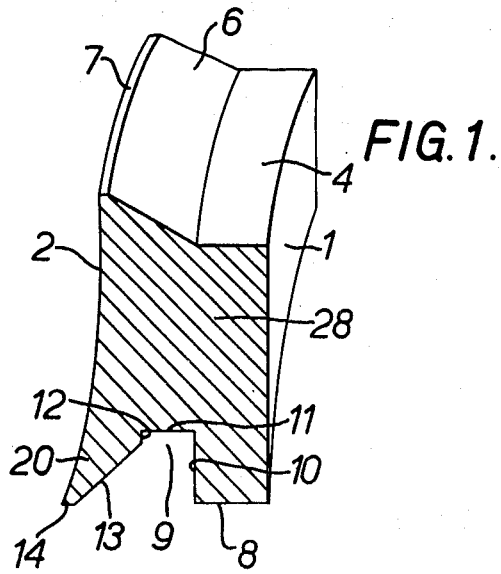
FIG. 1 is a cross section through the ring.

The sealing ring 28 shown in FIG. 1 is made of silicon rubber or any other suitable natural or synthetic elastomeric material which is nonpermeable and chemically inert.

The ring has at one axial end a flat annular face 1 normal to the ring axis and at the other axial end a face 2 which is a concave parabolic curve in radial section. The outer periphery of the ring comprises an annular portion 4 extending parallel to the axis of the ring, a frustoconical portion 6 and a rim 7. The surface of the frusto-conical portion is inclined outwardly from a ring axis. The inner periphery of the ring comprises an annular portion 8 parallel to the ring axis, an annular groove 9 defined by a wall 10 normal to the ring axis, a bottom wall 11 parallel to the ring axis and a wall 12 parallel to the wall 10, a frustoconical portion 13 and rim 14. The face 2, portion 13 and rim 14 define an annular tapered flange 20 which extends axially away from the central plane of the ring and radially inwards.

Figure 2:
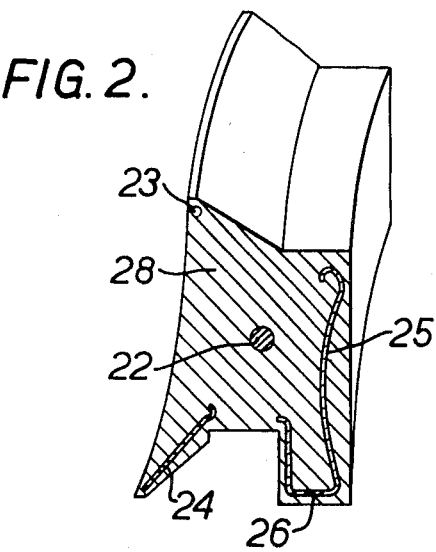
FIG. 2 is a cross section through a modified form of ring.

If desired, the sealing ring may, at the time of manufacture, be reinforced internally at suitable positions with suitable metallic and/or synthetic filaments, strips or cords to direct or retard inwards movement or deformation of the ring. Various reinforcements are shown in FIG. 2, where reinforcement 22 provides general resistance to distortion from the round if the ring is subjected to peripheral distortion when fitting, reinforcement 23 reinforces the outer rim and directs flexion towards the tapered flange, reinforcement 24 permits flexion of the tapered flange, an entity, about a given pivot position while controlling any tendency of the tapered portion to pucker, reinforcement 25 reinforces and controls deformation adjacent the face 1, and reinforcement 26 reinforces adjacent the walls 10 and 11 (if desired being combined with the reinforcement 25 to form a single reinforcing element. One or more of the above-mentioned reinforcements may be used as desired.

Figure 3:
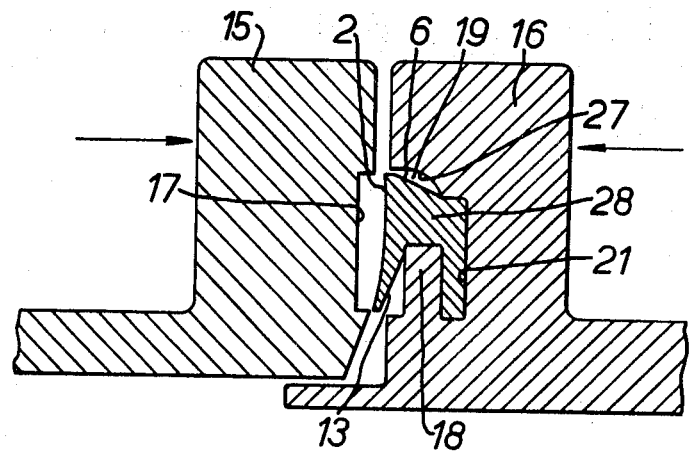
FIG. 3 is a sectional view showing two coupling members just prior to mating.

The manner of fitting the sealing ring 28 to a coupling having two opposed pipe flanges 15 and 16 is shown in FIG. 3. The flange 16 is machined to form a recessed seating 21 which will accept the sealing ring while leaving its face 2 exposed and projecting slightly from the face of the flange. The sealing ring is positively retained in this position by an annular projection 18 formed in the seating during machining. The annular projection 18 is a close fit in the groove 9 in the sealing ring. Thus the annular portion of the sealing ring retained in the seating can provide a seal between the ring and the flange 16. The face 27 of the recessed seating adjacent the frusto-conical portion 6 of the sealing ring is formed concave so that before the pipe flanges are clamped together, the portion 6 and the concave surface together define an annular space 19.

Figure 4:
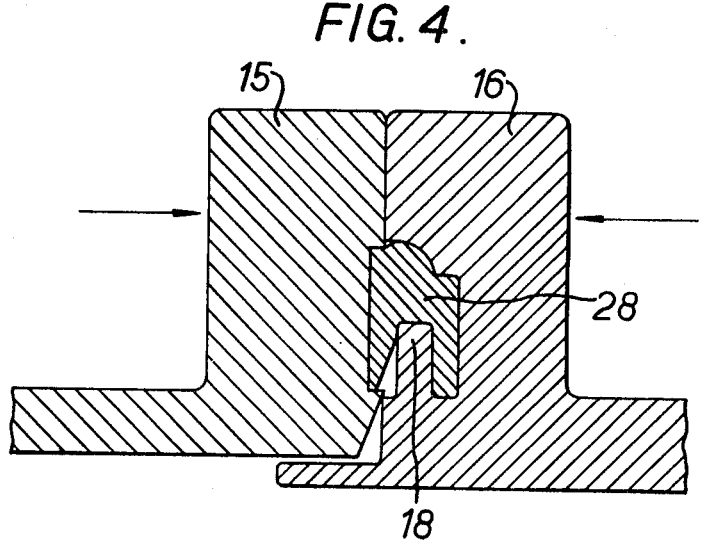
FIG. 4 is a sectional view showing the coupling members of FIG. 3 mated.

The flange 15 has an annular recess 17 machined into its face, the recess being such that it will accept the entire width of the flange on the sealing ring and the major part of its thickness, so that, when the opposing faces of the flanges 15 and 16 are brought into firm contact, the frusto-conical portion 13 of the sealing ring is forced back towards the annular projection 18 and completes the seal (see FIG. 4), the sealing ring bulging into the space 19.

The sealing ring shown in he drawings is capable of giving an efficient seal against high pressure in the pipes being coupled, even with low initial contact pressure between the faces of the coupling. The ring remains effective even if the pipes come under full or partial vacuum. The ring is easy to fit and readily removable while being positively located and attached when fitted so that it cannot be accidentally detached when disconnecting the coupling. The action of the ring depends to at least a substantial extent on flexion and not simply on compression and the material of the ring is therefore subjected to less arduous treatment in use than conventional rings.

I claim:

1. In a coupling comprising a first annular coupling member having a face portion extending perpendicular to the longitudinal axis of the coupling, a second annular coupling member having a face portion extending perpendicular to the longitudinal axis of the coupling making contact with the first coupling member along an interface formed by said respective faces perpendicular to the longitudinal axis of the coupling, and a U-shaped sealing ring made of elastomeric material disposed in sealing relationship between said coupling members in such a way that it offers no resistance to fluid passing through the coupling, the improvement comprising an annular recess in said first coupling member face intermediate the ends thereof which retains and is filled by one limb and a middle portion of said sealing ring in sealing relationship therewith, an annular projection formed on said first coupling member face extending within the bight portion of said sealing ring, said other limb of the sealing ring having an initially concave sealing surface which is deformed into engagement with a flat surface on the face of the second coupling member so that the inner and outer rims of said concave surface are biased into firm sealing engagement with said flat surface to oppose any leakage of fluid under pressure along the interface between the first and second coupling members.

2. A coupling according to claim 1, in which an annular surface is formed in said first coupling member, said sealing ring having a peripheral outer portion of frustoconical shape adapted to bulge out into sealing engagement with said annular surface when said other limb of the sealing ring is displaced into sealing engagement with said flat surface of said second coupling member.

3. A coupling according to claim 2, including reinforcement arranged within the sealing ring.

4. A coupling according to claim 3 in which the reinforcement is arranged parallel to the sealing surface of said sealing ring.

* * * * *